Figure 1:
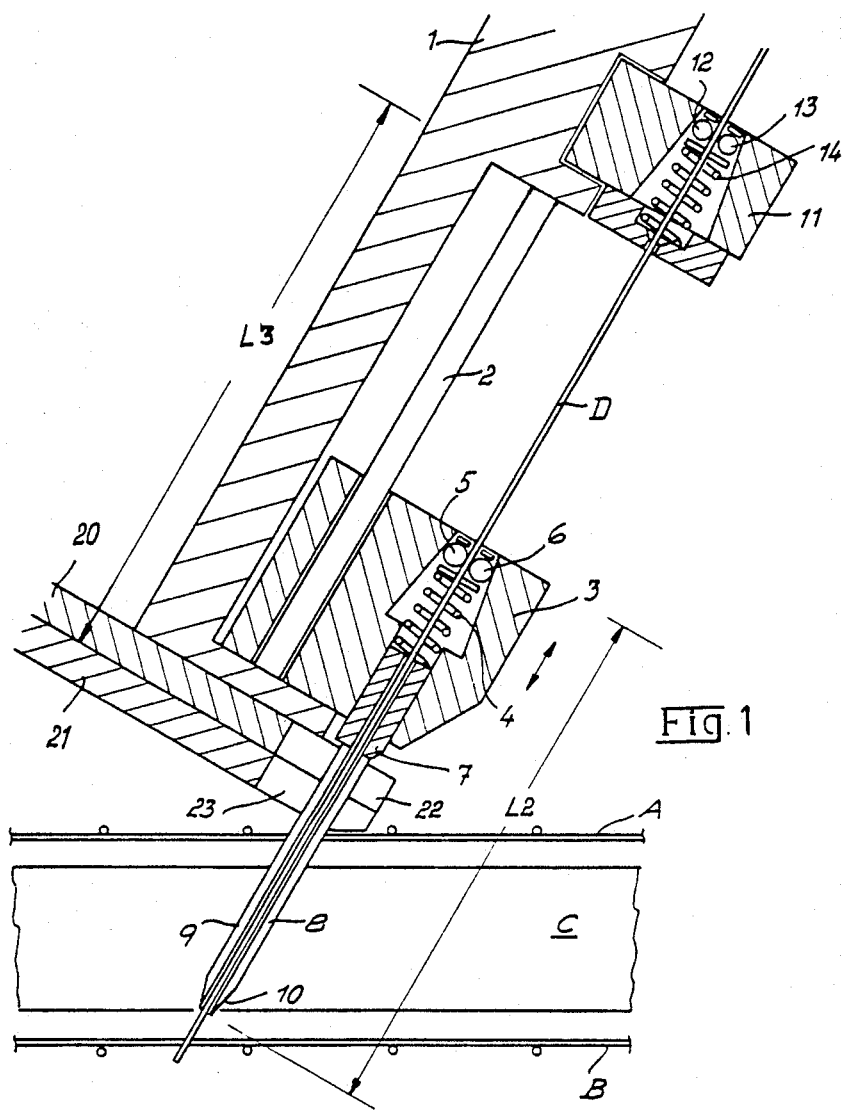

United States Patent [19]

Ritter et al.

[11] Patent Number: 4,506,818

[45] Date of Patent: Mar. 26, 1985

[54] DEVICE FOR THE PURPOSE OF PUSHING SECTIONS OF A WIRE THROUGH A SOLID BODY CONSISTING OF YIELDING MATERIAL

[75] Inventors: Gerhard Ritter; Klaus Ritter; Josef Ritter; Edgar Pollhammer, all of Graz, Austria

[73] Assignee: EVG Entwicklungs- und Verwertungs-Gesellschaft m.b.H., Graz, Austria

[21] Appl. No.: 470,637

[22] Filed: Feb. 28, 1983

[30] Foreign Application Priority Data

Mar. 2, 1982 [AT] Austria .................. 800/82

[51] Int. Cl.³ .................. A43D 61/00; A43D 69/00; B25C 5/04
[52] U.S. Cl. .................. 227/67; 227/80; 227/82; 227/84
[58] Field of Search .................. 227/67, 82, 84, 80, 227/DIG. 1; 112/222, 224

[56] References Cited

U.S. PATENT DOCUMENTS

| | | | |
|---|---|---|---|
| 102,380 | 4/1870 | Donaldson et al. | 112/224 X |
| 2,171,388 | 8/1939 | Berger | 227/80 |
| 3,134,982 | 6/1964 | Gagnon et al. | 227/93 |
| 3,356,047 | 12/1967 | Short | 112/222 |
| 3,469,548 | 9/1969 | Zocher | 112/222 |
| 3,986,468 | 10/1976 | Szostak et al. | 112/222 |
| 4,356,947 | 11/1982 | Marshall et al. | 227/84 |
| 4,389,011 | 6/1983 | Lovibond | 227/84 |

Primary Examiner—Paul A. Bell
Assistant Examiner—Taylor J. Ross
Attorney, Agent, or Firm—Ernest F. Marmorek

[57] ABSTRACT

In order to be able to remove the wire from its supply source and in order to be able to prevent a bending of the wire, a wire-feed-clamp (3) can be moved along an alignment element (2) which, in a fixed position, is arranged on a carrier (1), whereby the wire-feed-clamp (3) produces a one-sided gripping effect and whereby a hollow needle (8) is affixed on the front side of the wire-feed-clamp (3), for the purpose of penetration of the solid body; at the rear extremity of the alignment element (2), a return-motion stopping-element (11) for the wire is arranged which, in the same sense as the wire-feed-clamp (3), produces a one-sided gripping effect and is aligned with the hollow needle (8) and whereby in front of the alignment element (2), a cutting element (20, 21) is arranged for the purpose of cutting-off the wire section which, at any given time, had been pushed through the solid body.

3 Claims, 3 Drawing Figures

DEVICE FOR THE PURPOSE OF PUSHING SECTIONS OF A WIRE THROUGH A SOLID BODY CONSISTING OF YIELDING MATERIAL

The invention relates to a device for the purpose of pushing a wire through a solid body consisting of yielding material, for example foam material or minerally bound wood fibers, with this being accomplished by means of a hollow needle.

The utilization of hollow needles for the purpose of pushing wire sections through a solid body consisting of yielding material is known, for example, in cases of surgical instruments, which serve for the suturing wounds, as well as in cases of machines for the purpose of spiking or larding of meat.

In cases involving the building trade, quite different requirements are made of devices of the initially cited type, such as when say for assembly purposes or the like, sections of a wire, without danger of bending and in rapid succession, are to be pushed through a building material, in particular a relatively hard building material such as minerally bound wood fibers ("Heraklith"), whereby for the purpose of eliminating manual loading processes, the wire is to be removed from a supply source and whereby the wire section, which at any given time has been pushed through the building material, has to be cut-off from the supply source.

This problem, which is to be solved by means of the invention, shows up for example in the case of a process, suggested in another place, namely a process for the production of welded constructural elements, which consist of two parallel, flat lattice mats and of a insulating plate arranged in the space between these mats, whereby by means of the device designed according to the invention, stay-wires can be pushed through the insulating plate, which stay-wires are then welded together with the two lattice mats and thereby connect the lattice mats and the insulating plate to one structural unit and, at the same time, retain the insulating plate in its proper position within this structural unit.

The described problem is solved in the following manner by means of the invention, namely in that in the case of a device of the initially cited type, a wire-feed clamp can be moved along an alignment element which, in a fixed position, is arranged on a carrier, whereby the wire-feed-clamp produces a one-sided gripping effect and whereby the hollow needle is affixed at its front side, and in that at the rear extremity of the alignment element a return-motion stopping-element is arranged for the wire, which return-motion stopping-element, in the same sense as the feed-clamp, produces a one-sided gripping effect and is aligned with the hollow needle and in that in front of the alignment element a cutting element is arranged for the purpose of cutting-off the wire section which, at any given time, had been pushed through the solid body.

Figure 2:
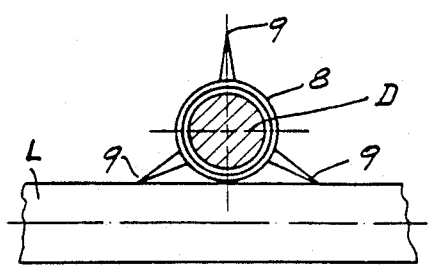
Figure 3:
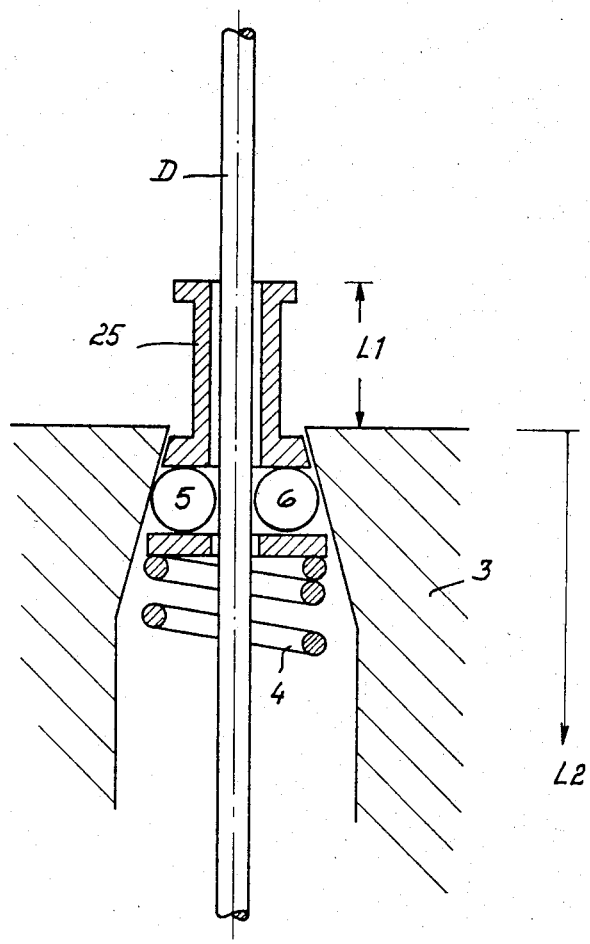

Further characteristics and advantages of the invention will become apparent from the following description of an exemplified embodiment while making reference to the drawings. In the latter, FIG. 1, in a schematic manner, shows the essential components, of a device designed in accordance with the invention, in form of a longitudinal section, FIG. 2 shows a cross-sectional view of the hollow needle of this device, and FIG. 3 shows a longitudinal section through a modified component part of the same.

The device illustrated in FIG. 1 is to be considered as being attached to a machine destined for the production of sound- and heat-insulating wall components, which display lattice mats A and B which are arranged on both sides of an insulating plate C, which lattice mats A and B are connected with one another to form a rigid unit by means of the device designed in accordance with the invention, namely through the intervention of stay wires which, in different sloping positions, had been pushed through the insulating plate C, had been welded together with the lattice mats A or B on both sides of the insulating plate C and subsequently had been cut-off from the wire supply-source D. The carrier 1 of each device designed in accordance with the invention, is connected with the cited processing machine in a manner which is not illustrated here.

The device designed in accordance with the invention displays a feed-clamp 3 which, by known means which are not illustrated, can be moved forward and backward along a guide-rail 2, with said feed-clamp 3 serving wire D which, for example, has been removed from a reel, whereby in the conical borehole of the feed-clamp 3 clamping-balls or clamping-rollers 5, 6 are arranged, which are loaded by a spring 4. In the feed-clamp 3 a wire-outlet guiding-element 7 is provided, at which a hollow needle 8 is affixed, the internal diameter of which has a dimension which is of such an order of magnitude, so that the wire D can be pushed through said hollow needle 8. In order to impart a special rigidity to the hollow needle, three ribs 9 are provided, which in outward direction are sharpened in a knifelike manner and display pointed frontal extremities 10. As it can be seen from FIG. 2, the ribs are arranged along the circumference of the hollow needle at an angular distance of 120° and their height corresponds approximately to the external radius of the hollow needle. As it can be seen from FIG. 3, the following is achieved through this design of the hollow needle 8, namely that the outer surface of the same can be brought in direct contact with, for example, a longitudinal wire L of the lattice mat A or B. As a result of this, it is possible to weld the stay wires together with the longitudinal or transverse wires of the lattice, without that the wires are bent by the electrodes.

A return-motion stopping-element 11 for the wire D cooperates with the feed-clamp 3, which element 11 is affixed in a non-movable manner on carrier 1 and likewise displays clamping-balls or clamping-rollers 12, 13 which are arranged in a conical borehole and are loaded with a spring 14.

At the frontal extremity of the device, two cutter beams 20, 21 are provided which extend in perpendicular manner to the drawing plane of FIG. 1 and can be moved with respect to one another by known means which are not illustrated, whereby at their frontal edges the cutter beams 20, 21 display recessed areas 22, 23, through which the feed track for wire D extends, so that after retraction of the feed-clamp 3 along guiding element 2 up to the point of release of the forwardly advanced section of wire D, the latter can be cut-off from the wire supply source at a slight distance from the lattice mat A, namely through the reciprocal movement of the cutter beams 20, 21. The movements of the feed-clamp 3 and of the cutter beams 20, 21 can be brought about by means known to the expert in the field, such as for example through the intervention of hydraulically or pneumatically operating working cylinders, which operate automatically within the working cycle of the machine.

As soon as the feed-clamp 3 is moved toward the insulating plate C, the hollow needle 8 together with the wire D which is guided within it, acts in the manner of a nail which consists of two axial parts and is driven into the insulating body. Due to the wire guidance within the rigid hollow needle 8, not only a buckling of the long and thin wire is prevented when exposed to the effect of the force exerted on it by the feed-clamp 3, but also the force which is required for the forward thrusting of the wire is reduced in comparison to the case that the wire is thrust forwardly by itself. The force required for the forward thrusting of a wire into an insulating body and thus the force acting on the wire, is made up of two components, namely of the head resistance, which the blunt frontal extremity of the wire has to overcome when penetrating into the insulating body, and the friction resistance acting on the outer surface of the wire, which friction resistance grows proportionally to the depth of penetration into the insulating body. As a result of the use of the hollow needle 8, the resistance acting on wire D remains always constant and is made up of the head resistance and of the particular friction resistance which acts on the short piece of wire which projects from the hollow needle 8. Since the magnitude of the outer surface of this piece of wire remains the same during the entire insertion process, also the resistance acting on this outer surface remains the same.

As soon as wire D has attained its correct position with respect to the insulating plate C, the hollow needle 8 is again retracted. The return-motion stopping-element 11 prevents the wire D from following the motion of the backward moving feed-clamp 3. When the feed-clamp 3 and the hollow needle 8 have attained their starting position, the cutting element formed by the cutter beams 20, 21 is set into motion.

The cutter beam 20 is moved up to the point at which its cutting edge comes to lie against the wire D which had just been pushed forward, and can then act as abutment for wire D during the cutting process. Subsequently, the cutter beam 21 is moved in opposite direction and separates the advanced longitudinal section from wire D.

As it can be seen from FIG. 1, a piece of the wire D projects then beyond the frontal extremity of the hollow needle 8, whereby the length of this wire piece is equal to the thickness of the cutter beam 20. In cases in which, for example, the insulating plate C consists of a particularly hard material and is to be penetrated at an acute angle, this can lead to troubles as a result of the bending of the thin, projecting wire extremity.

FIG. 3 shows a form of execution of the feed-clamp 3, by means of which this trouble-causing wire projection is prevented. At the upper extremity of the feed-clamp 3 a guide-collar 25 is arranged in an axially displaceable manner, however, this guide-collar 25 is retained in a form-locked manner at the clamp. When the feed-clamp 3 is moved toward the return-motion stopping-element 11, the guide-collar 25 abuts first of all against the return-motion stopping-element 11. When the feed-clamp 3 is mover further on, the guide-collar 25 is pressed into the hollow area of the feed-clamp 3 and thereby pushes the clamping balls or clamping rollers 5, 6 into the widened portion of the hollow area. Since during the movement of the feed-clamp 3 in the direction toward the return-motion stopping-element 11 the wire D is tightly retained by the return-motion stopping-element 11, the position of the wire does not change at all.

As soon as the feed-clamp 3 has attained its final rear position, the guide-collar 25 has simultaneously attained its lowest position in the hollow area of the feed-clamp 3 and the tip of the hollow needle 8 is removed in its entirety from the range of the cutter beam 20 and lies exactly outside of the upper edge of the same.

After the cutting process had taken place, a piece of wire again projects beyond the outlet opening of the hollow needle 8. If one now selects the length L1 of the guide-collar 25 in such a manner, so that in the particular position of the guide-collar 25—in which the clamping balls 5, 6 seize the wire D and take it along—the relationship $L1+L2=L3$ is valid, whereby L2 is the total length of the feed-clamp 3 inclusive of the hollow needle 8 and L3 is the distance between the cutter beam 21 and the return-motion stopping-element 11, then—during the forward movement of the feed-clamp 3—the latter can move forward first of all, without taking wire D along, until the projecting wire extremity has completely entered into the hollow needle 8. It is only then that the wire is taken along.

The hollow needle 8 and the guide-collar 25 have to be available in an exchangeable manner and in different complementary lengths, in order to be able to produce lattice bodies of different dimensions.

The process can be carried out, as it is shown in FIG. 1, with a wire D which projects beyond the extremity of the hollow needle (for example, when penetrating a relatively soft material), or as described above, it can also be carried out with a wire which, in its entirety, has been inserted into the hollow needle 8.

In the case of a machine for the production of structural elements consisting of lattice mats A, B and the insulating plate C, namely in transverse direction to the forward thrusting track of these components, rows of oppositely inclined devices designed in accordance with the invention are arranged which at distances with respect to one another push the stay-wires, which penetrate through the insulating plate, in forward direction. The cutter beams 20, 21 are then designed in form of a cutting toothed element, whereby the recessed areas 22, 23 correspond to the spaces between the cutting teeth.

We claim:

1. Device for the purpose of pushing sections of a wire through a solid body consisting of yielding material, for example foam material or minerally bound wood fibers, with this being accomplished by means of a hollow needle, characterized in that a wire-feed-clamp (3), which produces a one-side gripping effect, can be moved along an alignment element (2) which, in fixed position, is arranged on a carrier (1), whereby the hollow needle (8) is arranged at the front side of the wire-feed-clamp (3), and in that at the rear extremity of the alignment element (2), and in a non-movable manner with respect to the carrier (1), a return-motion stopping element (11) is arranged for the wire, which return-motion stopping element (11), in the same sense as the feed-clamp (3), produces a one-sided gripping effect and is aligned with the hollow needle (8), and in that in front of the alignment element (2) a cutting element (20, 21) is arranged for the purpose of cutting-off, after retraction of the feed-clamp (3) along guiding element (2) up to the point of release of the forwardly advanced section of wire D, the wire section which has been pushed through the solid body.

2. Device according to claim 1, characterized in that the hollow needle (8) is reinforced by longitudinal ribs (9) which in outward direction are sharpened in a knife-like manner and are pointed at their frontal extremities (10), whereby preferably three longitudinal ribs (9) are provided which are arranged with respect to one another at an angular distance of 120° and the height of which is approximately equal to the external radius of the hollow needle (8).

3. Device according to claim 1, characterized in that in the conical borehole of the feed-clamp (3), namely above the clamping balls or clamping rollers (5, 6), a guide collar (25) is arranged which, at its lower extremity, is retained in a form-locked manner within the borehole, projects beyond the front end of the borehole at a distance, the dimension of which equals that of the thickness of the cutter beams and, by raising the feed-clamp, can be axially displaced by the amount of this distance.

* * * * *